United States Patent Office 2,998,516
Patented Aug. 29, 1961

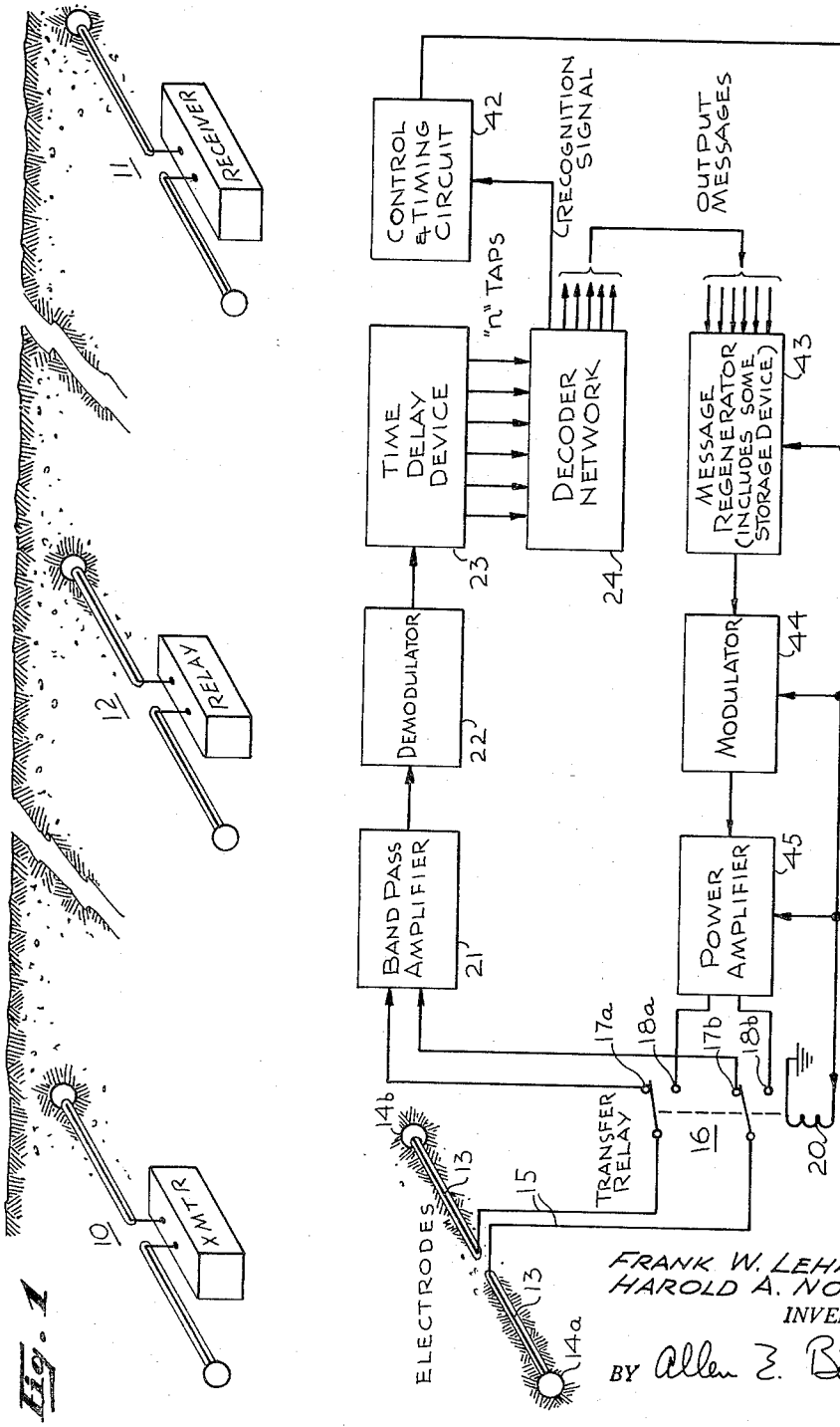

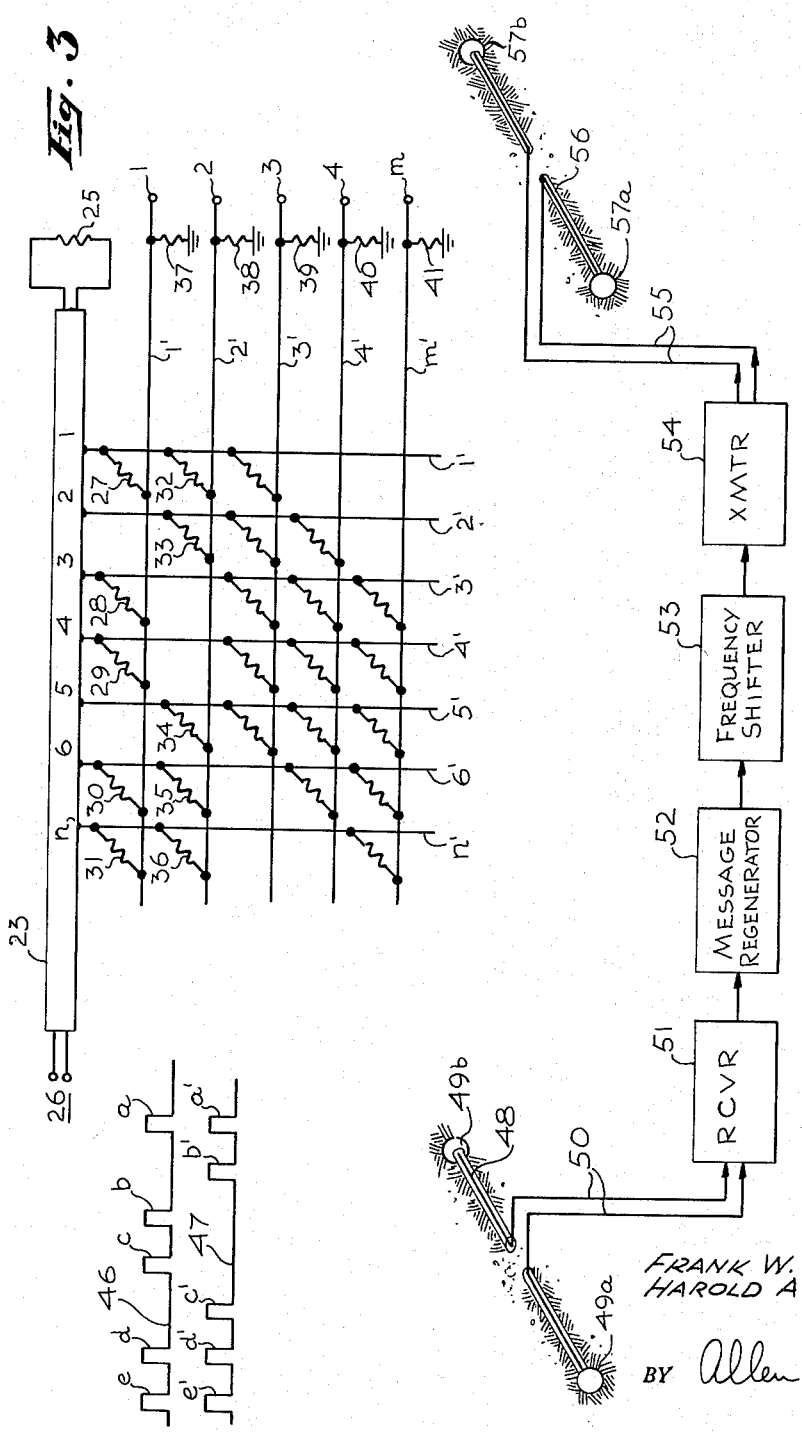

2,998,516
SUBSURFACE RELAY STATION APPARATUS
Frank W. Lehan, Glendale, and Harold A. Norby, Sepulveda, Calif., assignors to The Space Electronics Corporation, Glendale, Calif., a corporation of California
Filed June 22, 1959, Ser. No. 822,019
4 Claims. (Cl. 250—5)

The present invention relates in general to subsurface signalling systems and more particularly to a relay station for such a system.

It is well known that signals become very greatly attenuated when they are transmitted over relatively large distances, which makes it quite difficult to detect them above the noise at the receiver station. Furthermore, because of the ambient properties of those mediums through which signals may be propagated, the signals oftentime become distorted to the point where they can no longer be identified or recognized, thereby resulting in the partial or entire loss of the information represented by the signals. To prevent these things from happening, relay stations are built and positioned intermediate the transmitter and receiver of a system. These relay stations receive the attenuated and distorted signals and then regenerate them toward the receiver in substantially their original form.

The problems mentioned above are especially acute in connection with underground signalling systems wherein the earth is used as the propagating medium. By comparison, signals transmitted through the earth are very sizeably attenuated and distorted and, hence, cannot be propagated for large distances without the aid of such relay stations.

It is, therefore, an object of the present invention to provide a relay station for a subsurface signalling system.

It is another object of the present invention to provide electrical equipment that is adapted to re-transmit information signals propagated through the earth.

The present invention overcomes the above-mentioned and other difficulties encountered when signals are transmitted through the earth and it does so in either of two ways, namely, by re-transmitting the signals only after they have all been received and stored or by re-transmitting them as they are received, either at the same or some other frequency.

More particularly, according to a first embodiment of the present invention that is adapted for the regeneration of pulsed carrier signals, the signals are received by an antenna structure that is well suited for the reception of signals propagated through the earth. The received signals are then successively demodulated, decoded and recorded. After the entire message has been recorded, the signals are then regenerated in improved form, power amplified and radiated once again by the same antenna structure previously used for reception.

Aside from the fact that the relay apparatus of the first embodiment serves the useful purpose of reshaping and building up the power of the signals transmitted, it also offers the advantage of requiring only a single antenna structure for both reception and radiation purposes.

According to another embodiment of the present invention suited for either continuous wave or pulsed carrier reception, the signals are received by a first antenna structure and, after re-generation, are transmitted by a second antenna structure. Regeneration in this embodiment involves not only demodulation, decoding and signal regeneration as before but also frequency shifting whereby the signals are re-transmitted at a frequency that is different from that of the signals when they are received.

One obvious advantage of this embodiment is its ability to regenerate and re-transmit signals at the same time that they are received. Thus, this embodiment is inherently fast acting relay apparatus. Another advantage is found in the fact that the signals are subjected to a predetermined frequency shift upon regeneration. It will be apparent that if signals from different sources and, hence, of respectively different frequencies, each experience a fixed frequency shift, then a relatively large number of messages may be handled simultaneously. As a result, the operating speed of the relay apparatus is enhanced. Furthermore, a saving in equipment and expense is achieved since one such relay station can provide the services of several of them.

The novel features which are believed to be characteristic of the invention, both as to its organization and method of operation, together with further objects and advantages thereof, will be better understood from the following description considered in connection with the accompanying drawings in which two embodiments of the invention are illustrated by way of example. It is to be expressly understood, however, that the drawings are for the purpose of illustration and description only and are not intended as a definition of the limits of the invention.

FIG. 1 is a block diagram illustrating generally the relation between a subsurface signalling system and an associated relay station;

FIG. 2 is a block diagram of one embodiment of a relay station according to the present invention;

FIG. 3 is a schematic circuit of the decoder portion of the apparatus of FIG. 2; and FIG. 4 is a block diagram of another embodiment of a relay station according to the present invention.

Referring now to the drawings, there is generally depicted in FIG. 1 the relation between a relay station and the transmitter and receiver portions of an underground signalling system. The transmitter portion is generally designated 10 and is effective to radiate signals toward the receiver portion which is generally designated 11. A relay station, generally designated 12, is located between the transmitter and receiver apparatus, the relay apparatus being operable to receive attenuated and distorted signals from transmitter apparatus 10 and, after restoring these signals to their original condition, to transmit them once again toward receiver apparatus 11.

Relay station apparatus for the purposes mentioned is shown in FIG. 2, the embodiment shown being specifically adapted for the regeneration of signals of the pulsed carrier type. As shown, the apparatus comprises an antenna 13 which is grounded at its ends by means of a pair of electrodes 14a and 14b but which is insulated from the earth therebetween. The antenna output is coupled by means of some cabling 15 to a transfer relay, generally designated 16, which is operable to connect the cabling and, therefore, the antenna, to either of two pairs of relay terminals designated 17a, 17b and 18a, 18b, respectively. Terminals 17a and 17b may be considered to be input terminals whereas terminals 18a and 18b may be looked upon as output terminals. Relay 16 normally keeps antenna 13 coupled to input terminals 17a and 17b but, upon activation of the relay coil, designated 20, the antenna is connected instead to output terminals 18a and 18b.

Input terminals 17a and 17b are connected to a bandpass amplifier 21, a demodulator 22 being connected between the amplifier and a time delay device 23 which may be a transmission line type or magnetostrictive type of delay line or possibly a magnetic recorder adapted to produce prescribed time delays between its input and output signals, or any one of a number of other time delay producing devices. Time delay device 23 preferably has $n$ output terminals, where $n$ is an integer that is equal to the number of bauds or pulse positions employed for information transmission. The $n$ output terminals of device 23 are respectively connected to the $n$ input terminals of a decoder network 24 which, in turn, has $m$ output terminals, where $m$ is also an integer and equal to the number of different characters of information or pulse combinations utilized with the $n$ bauds available.

A better understanding of delay device 23 and decoder network 24 may be had by referring to FIG. 3 wherein the time delay device is shown as a transmission line type of delay line 23 having $n$ output taps numbered from 1 to $n$ and the decoder network is shown as a resistor matrix connected between the $n$ delay line taps and a plurality of $m$ output terminals numbered from 1 to $m$.

Delay line 23 is terminated in its characteristic impedance as represented by a resistor 25 at the output end of the line and the input terminals to the delay line are designated 26. With respect to the $n$ delay line taps, they are spaced from each other according to the time spacings encountered between pulses of the various signal patterns applied to the line. Thus, delay line taps 1 to $n$ may be equally or unequally spaced from each other.

The resistor matrix constituting decoder 24 includes a first set of $n$ wires respectively connected to the $n$ taps of delay line 23 and a second set of $m$ wires respectively connected to the $m$ output terminals. Accordingly, the first set of wires is designated $1'$ to $n'$ and the second set of wires is designated 1 to $m'$. The two sets of wires are interconnected through a plurality of resistors, the points of interconnection forming a plurality of $m$ wire connection patterns that respectively correspond to the plurality of signal patterns referred to above. By way of example, the resistors designated 27 to 31 respectively interconnect wires $1'$, $3'$, $4'$ and $n'$ of the first set of wires to wire $1'$ of the second set of wires and, similarly, the resistors designated 32 to 36 respectively interconnect wires $1'$, $2'$, $5'$, $6'$ and $n'$ to wire $2'$, the interconnections through resistors 27 to 31 forming a first wire connection pattern and the interconnections through resistors 32 to 36 forming a second such pattern. Interconnections through other resistors that are shown but not designated form still other wire connection patterns. It will be obvious that there are $m$ wire connection patterns, one for each combination of pulses representing a character of information. Finally, a plurality of $m$ load resistors, designated 37 to 41, are respectively connected between wires $1'$ to $m'$ and ground.

Referring now to FIG. 2 once again, the $m$ output terminals of decoder 24 are connected to both a control and timing circuit 42 and a message regenerator 43 which includes as an inherent part thereof a storage device such as a magnetic drum or tape recorder. More specifically, one of the $m$ output terminals of decoder 24 is connected to control and timing circuit 42 and the remaining $m-1$ output terminals of the decoder are connected to message regenerator 43. This is to say that output terminal 1 of the $m$ output terminals of the resistor matrix of FIG. 3 is connected to the control and timing circuit and output terminals 2 to $m$ thereof are connected to the message regenerator.

With respect to control and timing circuit 42, this may be any circuit which is operable in response to a pulse applied to it to produce another pulse a predetermined interval of time after the occurrence of the first pulse. Thus, circuit 42 may be any clock controlled pulse generator whose timing mechanism is activated by the applied pulse and which, in turn, activates the pulse generator the selected time period later. Such devices are well known and available. Again, circuit 42 may be a delay line whose time delay between its input and output ends is equal to the aforesaid interval of time. For reasons that will become clearer later, this time interval is equal to and preferably slightly greater than the total message time.

As for message regenerator 43, this apparatus is of the type that records the information signals out of decoder 24, retains them in recorded form for the aforementioned prescribed interval of time, and then encodes the signals once again in the same manner that they were originally encoded. The recording mechanism may be a magnetic drum or tape recorder, as previously mentioned, having $m-1$ recording tracks or channels. The encoder, on the other hand, may be identical to the combination of time delay device 23 and decoder network 24 shown in FIGS. 2 and 3, except that the output terminals of decoder network 24 become the input terminals of the encoder network and the input terminals of time delay device 23 now become the output terminals of the encoder and, for that matter, of message regenerator 43. Considering the encoder of message regenerator 43 in greater detail by referring to FIG. 3, output terminals 2 to $m$ therein become the input terminals of the encoder and these are respectively coupled to the $m-1$ tracks of the recording mechanism. On the other hand, input terminals 26 become the output terminals of the encoder and of the message regenerator. Further clarification will be had when the operation of message regenerator 43 is taken up for discussion later.

Referring back again to FIG. 2, the output end of message regenerator 43 is connected to the first of two input terminals to a modulator 44, the second modulator input terminal being connected to the output end of control and timing circuit 42. Modulator 44, in turn, is connected to the first input terminal of a power amplifier 45, a second input terminal to the power amplifier also being connected to control and timing circuit 42. Power amplifier 45 is connected at its output to output terminals 18a and 18b. Finally, in addition to being connected to modulator 44 and power amplifier 45, control and timing circuit 42 is also connected to one end of transfer relay coil 20, the other end of the coil being grounded.

In considering the operation of the relay station apparatus of FIG. 2, it should first be mentioned that the different bits or characters of information constituting an entire message are represented by different combinations of pulses and that each such combination of pulses may be referred to as a pulse group. Furthermore, it should also be mentioned that a message or sequence of pulse groups is preceded by a particular pulse group that indicates upon receipt that a message is to immediately follow. Such a particular pulse group is generally referred to as a recognition signal and will hereinafter also be referred to as such.

Considering now the operation in detail, when a sequence of radio-frequency pulse groups constituting a recognition signal and a message are received by antenna 13, they are passed through input terminals 17a and 17b to amplifier 21 wherein the received signals are amplified. The radio-frequency pulses out of amplifier 21 are then demodulated in demodulator 22 which thereby produces a corresponding sequence of video pulse groups. The kind of pulse groups that may be obtained out of demodulator 22 is illustrated in FIG. 3 by the two pulse groups designated 46 and 47 therein. By way of example, the group of pulses designated 46 may be looked upon hereinafter as a recognition signal and the group of pulses designated 47 may be construed as representing a bit or character of information in the message. Other combinations of such pulses represent still other portions of the message.

Returning to FIG. 2, the video pulse groups out of demodulator 22 are applied to time delay device 23 which cooperates with decoder network 24 to produce a single pulse for each pulse group whose amplitude corresponds to the sum of the amplitudes of the pulses in the associated pulse group. More specifically, each pulse group applied to time delay device 23 has its pulses delayed in such a manner that they appear simultaneously at a corresponding number of the $n$ output terminals thereof and, as a result, a single strong output pulse representing the entire pulse group is produced at an associated one of the $m$ output terminals of decoder network 24.

A clearer conception of what takes place within device 23 and network 24 may be had by referring once again to FIG. 3 wherein video pulse group 46 having pulses $a$ to $e$ and video pulse group 47 having pulses $a'$ to $e'$ are successively applied to input terminals 26 of delay line 23. With respect to pulse group 46, pulses $a$ to $e$ thereof are successively propagated down the delay line until they are respectively or simultaneously produced at delay-line taps 1, 3, 4, 6 and $n$. These pulses appear simultaneously at the taps designated because the delay times between these taps are respectively equal to the time intervals between the pulses. More specifically, the delay time between taps 1 and 3 is equal to the time spacing between pulses $a$ and $b$, the delay time between taps 3 and 4 is equal to the time spacing between pulses $b$ and $c$, etc., the delay time between taps 6 and $n$ being equal to the time spacing between pulses $d$ and $e$. When pulses $a$ to $e$ are produced at taps 1, 3, 4, 6 and $n$, they are also simultaneously produced across resistors 27 to 31, with the result that a pulse of relatively large amplitude is produced across load resistor 37, that is, at decoder output terminal 1.

For similar reasons, pulses $a'$ to $e'$ of pulse group 47 are simultaneously produced at delay-line taps 1, 2, 5, 6 and $n$ and, therefore, simultaneously developed across resistors 32 to 36, thereby causing a relatively large amplitude pulse to be produced at decoder output terminal 2. Other pulse groups will, in the manner described, also produce output pulses at other of the decoder output terminals. It is thus seen that the above-said combination of time delay device 23 and decoder network 24 is able to recognize and respond to any one of a plurality of signal pattern sequences by producing a strong signal at the proper output terminal. With respect to noise and signals in improper registration, no such large output pulse is produced which means that messages may be received against the background of noise and other undesirable signals.

Returning now to FIG. 2, the pulse produced at the output of decoder network 24 in response to the recognition signal is applied to control and timing circuit 42. This pulse activates the timing mechanism in circuit 42 which, in turn, activates a pulse generator therein a predetermined period of time later, namely, after the entire message has been received, whereby a control pulse is produced by circuit 42 said period of time later. In the meantime, that is, in the time interval between the applicatoin of a pulse to control and timing circuit 42 and the production of a pulse by that circuit, the sequence of pulses representing the various characters of information and produced at the remaining output terminals of decoder network 24 are applied to message regenerator 43.

In message regenerator 43 the information pulses are first applied to a plurality of threshold circuits designed to keep out unwanted signals and passed therethrough to a tape recorder which records the full message out of the decorder network. It will be recognized that the tape recorder should be able to record on as many channels as there are terminals in the decorder network out of which the information pulses are received by the message regenerator, one recording track or channel for each such output terminal.

After the full message is recorded by the tape recorder in message regenerator 43, the tape recorder receives a control pulse from control and timing circuit 42 and, in consequence thereof, the tape recorder plays back the recorded message pulses. Upon being played back, the pulses are applied to the various input terminals of the encoder apparatus in the message regenerator which may be identical with the combination of time delay device 23 and decoder network 24 of FIG. 3, as previously mentioned. More specifically, the encoder apparatus may be exactly as shown in FIG. 3, the only exception being that the output and input terminals of the FIG. 3 arrangement would be the input and output terminals, respectively, of the encoder apparatus. Accordingly, in response to the pulses being applied to it by the tape recorder, the encoder apparatus reproduces or generates once again the sequence of pulse groups originally received at the input to time delay device 23.

By way of example, if the information pulse produced at output terminal 2 in FIG. 3 in response to pulse group 47 is first recorded and then played back so as to be applied to the same terminal 2, it will be recognized by those skilled in the art that pulses will be simultaneously applied to delay line taps 1, 2, 5, 6 and $n$. It will be recognized further that these pulses will be propagated down delay line 23 to terminals 26, thereby producing a series of pulses at these terminals that is identical to pulse group 47. In exactly the same manner, the encoder apparatus in message regenerator 43 takes the information pulses played back by the tape recorder and produces pulse groups from them that correspond to the original pulse groups out of demodulator 22. The message is thus regenerated.

The groups of video pulses out of message regenerator 43 are applied to modulator 44 which has also been triggered on by the control pulse produced by circuit 42. As a result, a radio-frequency signal is generated within modulator 44 which is modulated by the groups of pulses applied thereto to produce corresponding groups of radio-frequency pulses. These radio-frequency pulses are applied to power amplifier 45 which, having been previously activated by the control pulse out of control and timing circuit 42, amplifies the pulses and passes them on to output terminals 18$a$ and 18$b$. With respect to terminals 18$a$ and 18$b$, it should be mentioned that in addition to a control pulse being applied to message regenerator 43, modulator 44 and power amplifier 45 by control and timing circuit 42, a control pulse is also applied to coil 20 of transfer relay 16. In consequence thereof, antenna 13 is disconnected from terminals 17$a$ and 17$b$ and connected instead to terminals 18$a$ and 18$b$. Accordingly, when the radio-frequency pulse groups are passed by amplifier 45 to terminals 18$a$ and 18$b$, they are in turn passed to antenna 13 which radiates them into the surrounding earth for propagation toward the receiver site.

The embodiment of FIG. 2 is adapted to regenerate pulsed carriers at the frequency of the received signals. The embodiment of FIG. 4, however, is designed to accommodate either pulsed or continuous-wave signals and, furthermore, to handle messages received in different frequency channels. As shown, the relay station apparatus of FIG. 4 basically comprises a receiver antenna 48 whose construction is basically the same as antenna 13 of FIG. 2. Thus, antenna 48 is insulated from the earth intermediate its ends, the ends themselves being grounded by means of electrodes 49$a$ and 49$b$. The output of antenna 48 is connected by means of some cabling 50 to a receiver 51 which includes a bandpass amplifier and demodulator as previously shown in FIG. 2. A message regenerator 52 is connected between receiver 51 and a frequency shifter network 53, the output of the frequency shifter being connected to a transmitter 54. Transmitter 54 includes a power amplifier. The transmitter output is coupled by means of some cabling 55 to a transmitter antenna 56. Here again, the antenna is insulated from the earth intermediate its ends and connected to ground at these ends by means of electrodes 57$a$ and 57$b$ mounted thereon.

With respect to message regenerator 52, in the event the relay station apparatus of FIG. 4 is adapted for the relaying on of pulsed signals, then message regenerator 52 therein may include several of the units used in the embodiment of FIG. 2 or their equivalent. Thus, in such a case, message regenerator 52 may include time delay device 23, decoder network 24 and, except for the tape recorder, the equipment previously described as being included in message regenerator 43. The tape recorder is not required here because the message is being re-transmitted as it is received and, hence, it need not be recorded. Furthermore, message regenerator 52 may also include shaping and amplifying circuits between the decoder network 24 unit and the message regenerator 43 unit.

In the event the relay station apparatus is adapted for the relaying on of continuous-wave signals, then message regenerator 52 may simply include amplifying apparatus.

In considering the operation, attention will first be given to the case where the apparatus is adapted for pulsed signals. Where this is the case, the signals out of message regenerator 52 in FIG. 4 are identical with the signals out of message regenerator 43 in FIG. 2. Accordingly, except for the fact that no initial recording of the signals is necessary in the FIG. 4 embodiment, the operation of that embodiment to the output of message regenerator 52 therein is identical with the operation of the FIG. 2 embodiment to the output of message regenerator 43. Since the operation of the apparatus in FIG. 2 was previously described in detail, it is deemed unnecessary to repeat it here but, rather, is incorporated by reference.

Continuing, the groups of pulses out of message regenerator 52 are applied to frequency shifter 53 wherein a carrier signal generated therein is modulated by the pulses applied thereto. As a result, corresponding groups of pulsed carrier signals are generated. However, the frequency of the carrier generated in the frequency shifter is different by a predetermined amount from that of the carrier of the signals as received. Consequently, the pulsed carrier signals as regenerated have experienced a frequency shift relative to the incoming signals. The shift in frequency is sufficient to isolate the receiver and transmitter portions of the apparatus and thereby make it possible to simultaneously receive and transmit. The groups of pulsed carriers are power amplified by transmitter 54 and thereafter passed to antenna 56 which radiates the regenerated signals into the surrounding earth toward the distant receiver site.

Where the apparatus is adapted for continuous-wave signals, the incoming signals received by antenna 48 are first demodulated in receiver 51. The demodulated signals are then "built up" in message regenerator 52 which then applies them to frequency shifter 53. In the frequency shifter, a carrier is generated at a frequency that is different by a predetermined amount from the frequency of the carrier of the incoming signals. Thus, here again, when the signals are regenerated, they experience a frequency shift relative to the incoming signals. The signals out of frequency shifter 53 are passed to transmitter 54 which power amplifies them and then feeds them to antenna 56 whereat they are radiated toward the receiver station once again.

Having thus described the invention, what is claimed as new is:

1. Subsurface relay station apparatus comprising: an antenna adapted to receive and transmit modulated carrier signals through the earth, said antenna being electrically connected to the earth at its ends and insulated therefrom therebetween; a relay having first and second pairs of terminals, said antenna normally being connected to said first pair of terminals, said relay being operable in response to a control pulse applied thereto for switching the connections of said antenna from said first to said second pair of terminals; a band-pass amplifier for amplifying modulated carrier signals received by said antenna within a predetermined range of frequencies; an electrical circuit for demodulating signals out of said amplifier; decoder apparatus coupled to said electrical circuit for receiving demodulated signals therefrom, said decoder apparatus being operable in response to predetermined combinations of voltage pulses corresponding to predetermined combinations of pulsed carrier signals to sequentially produce a recognition pulse and information pulses that respectively represent said pulse combinations; a timer mechanism coupled to said decoder apparatus to receive said recognition pulse and operable in response thereto to produce a control pulse a predetermined period of time later; signal regenerating means coupled to said decoder apparatus to receive said information pulses, said regenerating means being coupled to said timer mechanism and operable in response to the control pulse therefrom to generate anew said combinations of pulses represented by said information pulses; a modulator coupled to said signal regenerator means and including oscillator means for generating a carrier signal, said modulator being coupled to said timer mechanism and operable in response to the control pulse therefrom to modulate said carrier signal with said newly generated pulse combinations to produce corresponding combinations of pulsed carrier signals; and an output circuit coupled between the second pair of terminals of said relay and said modulator and to said timer mechanism, said output circuit being operable in response to said control pulse to amplify said combinations of pulsed carrier signals and said relay being operable in response to said control pulse to connect said output circuit to said antenna, whereby said pulsed carrier signals are radiated into the earth for propagation therethrough.

2. The subsurface relay station defined in claim 1 wherein said decoder apparatus includes delay-line means having a plurality of output taps spaced therealong in such a manner that the successive time delays between at least one combination of said output taps vary as the periodicity of at least one combination of pulses, there being as many different ones of said combinations of output taps as there are different combinations of pulses; said delay-line means being operable to simultaneously produce the pulses of a pulse combination at the output taps, respectively, of the corresponding output tap combination; and an output circuit coupled to each combination of output taps for producing an output pulse whose amplitude corresponds to the sum of the amplitudes of the pulses simultaneously produced at the associated combination of output taps, one of said output circuits being connected to said timer mechanism and the other of said output circuits being connected to said signal regenerator means.

3. Subsurface relay station apparatus comprising: an antenna adapted to receive and transmit signals through the earth, said antenna being electrically connected to the earth at its ends and insulated therefrom therebetween; decoder means normally coupled to said antenna to receive signals intercepted by it, said decoder means being operable in response to different predetermined combinations of pulsed carrier signals successively applied thereto to produce voltage pulses that respectively represent said different combinations of pulsed carrier signals; signal regenerator means coupled to said decoder means and operable in response to said voltage pulses produced thereby to generate anew said combinations of pulsed carrier signals a predetermined interval of time later; and means for switching said antenna from said decoder means to said signal regenerator means said predetermined interval of time later, whereby said combinations of pulsed carrier signals are radiated into the earth for propagation therethrough.

4. The apparatus defined in claim 3 wherein said signal regenerator means includes timer means coupled to said decoder means, said timer means being operable in response to the first voltage pulse out of said decoder means to produce a control pulse said predetermined period of time later, said time interval being at least equal to the time required to receive all combinations of pulsed carrier signals in a message; a recorder mechanism coupled to said decoder and timer means, said mechanism being operable to record said voltage pulses as they occur and operable in response to said control pulse to play back said voltage pulses; and encoder means coupled to said recorder mechanism, said encoder means being operable in response to said played back voltage pulses to generate anew said combinations of pulsed carrier signals.

References Cited in the file of this patent

UNITED STATES PATENTS

| | | |
|---|---|---|
| 1,303,730 | Rogers | May 13, 1919 |
| 1,953,658 | Rassow | Apr. 3, 1934 |
| 2,687,476 | Gaunella | Aug. 24, 1954 |
| 2,796,602 | Hess | June 18, 1957 |
| 2,811,713 | Spencer | Oct. 29, 1957 |
| 2,894,258 | Vantine et al. | July 7, 1959 |